UNITED STATES PATENT OFFICE.

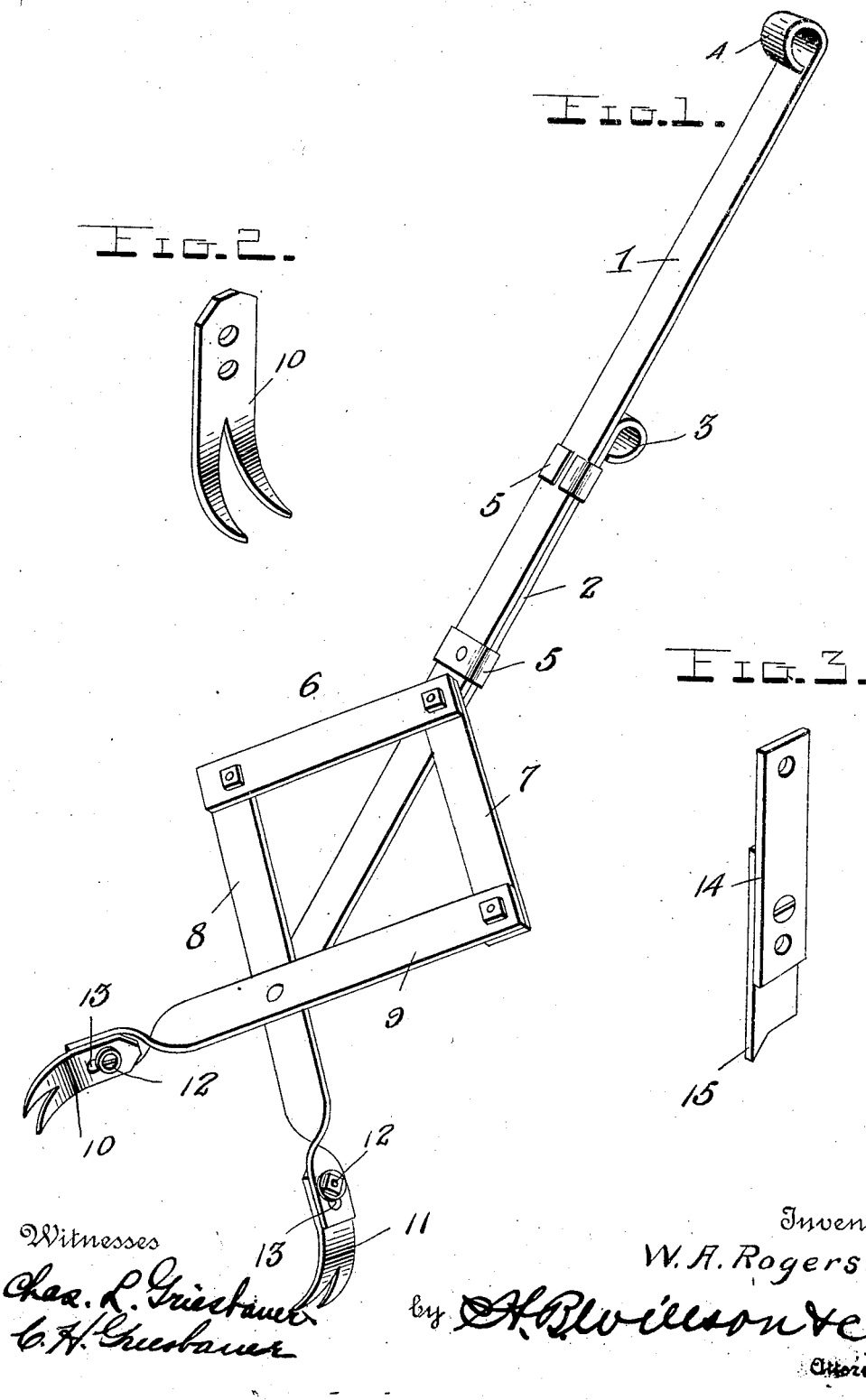

WILLIAM A. ROGERS, OF WOODWARD, OKLAHOMA, ASSIGNOR OF ONE-THIRD TO DAVE REID AND ONE-THIRD TO BEN. F. WILLETT, BOTH OF WOODWARD, OKLAHOMA.

GRAPPLE.

No. 923,299.　　　　Specification of Letters Patent.　　Patented June 1, 1909.

Application filed July 27, 1908. Serial No. 445,571.

*To all whom it may concern:*

Be it known that I, WILLIAM A. ROGERS, a citizen of the United States, residing at Woodward, in the county of Woodward and State of Oklahoma, have invented certain new and useful Improvements in Grapples; and I do declare the following to be a full, clear, and exact description of the invention, such as will enable others skilled in the art to which it appertains to make and use the same.

This invention relates to an improved grab hook or grapple.

The object of the invention is to provide a device of this character which is simple in construction, efficient in operation and which is constructed to provide for the interchangeability of the gripping or grappling members to adapt the device for use for various purposes.

With the foregoing and other objects in view, the invention consists of certain novel features of construction, combination and arrangement of parts, as will be more fully described and particularly pointed out in the appended claim.

In the accompanying drawings, Figure 1 is a perspective view of the device complete and in partially opened position; Fig. 2 is a detailed perspective view of one of the detached gripping members; Fig. 3 is a similar view of a modified form of gripping member.

In the embodiment illustrated two bars 1 and 2 are shown having the outer ends thereof bent to form loops 3 and 4 which are designed to receive the operating ropes or cables when the device is to be used in wells or at remote distances and for engagement by the hands of the operator when used on objects in close proximity. Each of these members 1 and 2 is provided with a clip as 5 secured to its respective bar by riveting or otherwise and having the ends thereof bent to form guides for the other bar whereby one is slidable on the other and is held against displacement laterally.

Two levers 6 and 7 are pivotally connected at one end with the free end of the bar 1 in any suitable manner. Pivotally connected with the free ends of the levers 6 and 7 are two levers 8 and 9 which are crossed intermediately of their ends and pivotally connected at the crossing point thereof with the free end of the bar 2, whereby a toggle joint connection is formed. The free ends of the levers 8 and 9 are preferably twisted as shown to cause the faces thereof to stand at right angles to the faces of the body of the bars. To these bent ends gripping members 10 and 11 are detachably connected in any suitable manner preferably by forming two longitudinally spaced apertures in said bent ends and in the hooks to be connected, those in the hooks registering with those in the ends and through said aperture bolts are passed and secured in place by washers and nuts in the usual manner.

If desired, a single bolt 12 may be passed through one of the apertures and have washers arranged thereon on opposite sides of the members connected, and a short headless bolt 13 may be passed through the other hole and held in position by the washers which overlap the ends of said bolt 13 and hold it securely in place, the two bolts being used to prevent lateral wabbling of the gripping members.

It will be observed that this grapple has a toggle-like action, the bars 1 and 2 being slidable on each other to open and close the gripping members at the ends of the toggle joint. When it is desired to withdraw a pipe or other tubular object which cannot be caught by the end, the levers 8 and 9 are removed and two members as 14 such as are shown in Fig. 3 are substituted therefor. These members 14 are provided at their free ends with points as 15 which are designed to be inserted within a pipe and to engage the walls thereof.

It will be evident that any desired form of gripping member may be substituted for the hooks shown by removing the bolts as 12 and hence the device may be used for withdrawing pipes from wells, for removing sand, gravel, etc., and for any other purpose for which they may be adapted.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

A grapple comprising two members slidable longitudinally one on the other, toggle-jointed levers pivoted at different points to the ends of said sliding members and projecting there-beyond, said projecting ends being twisted to form terminals extending at right angles to the members, said terminals having longitudinally spaced apertures, gripping members having longitudinally spaced apertures registering with those in the longitudinally slidable members, a bolt passing through one of the apertures in said members, washers arranged on said bolt at opposite sides of said connected members and overlapping the other openings therein, and a headless bolt extending through said washer covered apertures between said washers.

In testimony whereof I have hereunto set my hand in presence of two subscribing witnesses.

WILLIAM A. ROGERS.

Witnesses:
ALA K. STUART,
PAUL B. PATTY.